United States Patent

Burdeska et al.

[11] 3,898,234
[45] Aug. 5, 1975

[54] 4,4'-DINAPHTHYL-1,1',8,8'-TETRACARBOXYLIC ACID DIIMIDES

[75] Inventors: Kurt Burdeska, Basel; Guglielmo Kabas, Binningen; Andre Pugin, Riehen; Geza Kormany, Allschwil; Reinhard Zweidler, Basel, all of Switzerland

[73] Assignee: Ciba-Geigy AG, Basel, Switzerland

[22] Filed: Feb. 6, 1973

[21] Appl. No.: 330,161

[30] Foreign Application Priority Data
Feb. 18, 1972 Switzerland............ 2399/72

[52] U.S. Cl............. 260/281; 8/1 W; 252/301.2 W; 260/37 NP; 260/247.5 G; 260/268 PC; 260/345.2
[51] Int. Cl............. C07d 39/00
[58] Field of Search................. 260/281

[56] References Cited
UNITED STATES PATENTS
2,409,851  10/1946  Haddock............ 260/281
3,330,834  7/1967  Senshu............... 260/281

FOREIGN PATENTS OR APPLICATIONS
1,445,775  3/1969  Germany............ 260/281

OTHER PUBLICATIONS
Bradley et al., Jour. Chem. Soc. (London), 1954, pp. 4432–4435.

*Primary Examiner*—Donald G. Daus
*Attorney, Agent, or Firm*—Joseph G. Kolodny; Edward McC. Roberts; Michael W. Glynn

[57] ABSTRACT

New 4,4'-dinaphthyl-1,1',8,8'-tetracarboxylic acid diimides of the formula

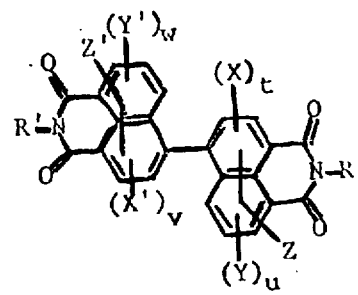

wherein R and R' independently of one another denote (a) hydrogen, (b) alkyl with 2 to 18 carbon atoms, (c) cycloalkyl containing 5 or 6 ring members and having 5 to 10 carbon atoms, (d) alkyl with 1 to 18 carbon atoms, substituted by hydroxyl, alkoxy with 1 to 12 carbon atoms, optionally halogen-, methyl- or methoxy-substituted phenyl, carboxyl, carbalkoxy with 2 to 13 carbon atoms, carbamoyl optionally substituted at the nitrogen by alkyl with 1 to 12 carbon atoms or phenyl, an optionally quaternised heterocyclic structure with 5 or 6 ring members, wherein 1 to 3 ring members represent nitrogen atoms, the sulpho group or its salts or optionally quaternised dialkylamine with 1 to 12 carbon atoms per alkyl part, (e) optionally halogen-, methyl- or methoxy-substituted phenyl or (f) an optionally quaternised heterocyclic structure with 5 or 6 ring members, wherein 1 to 3 ring members represent nitrogen atoms, and X and X' independently of one another denote alkoxy with 1 to 4 carbon atoms, or halogen, located in the 3- and 3'-position respectively, Y and Y' independently of one another denote alkoxy with 1 to 4 carbon atoms, acyloxy with 1 to 4 carbon atoms, benzoyloxy or halogen, located in the 6- and 6'-position respectively, $t$, $u$, $v$ and $w$ independently of one another denote the number 1 or 0 and Z and Z' independently of one another denote hydrogen or the sulpho group or its salts. These compounds are particularly useful as optical brighteners.

7 Claims, No Drawings

4,4'-DINAPHTHYL-1,1',8,8'-TETRACARBOXYLIC ACID DIIMIDES

The present invention relates to new 4,4'-dinaphthyl-1,1',8,8'-tetracarboxylic acid diimides, processes for their manufacture and their use as optical brighteners for organic materials.

The compounds according to the invention correspond to the formula 1

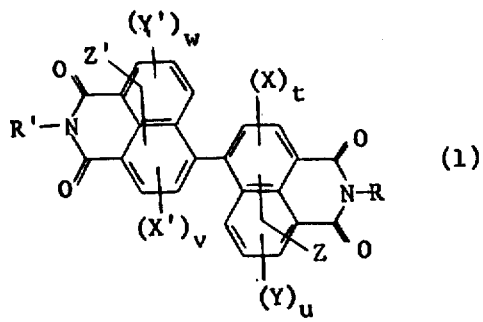

wherein R and R' independently of one another denote (a) hydrogen, (b) alkyl with 2 to 18 carbon atoms, (c) cycloalkyl containing 5 or 6 ring members and having 5 to 10 carbon atoms, (d) alkyl with 1 to 18 carbon atoms, substituted by hydroxyl, alkoxy with 1 to 12 carbon atoms, optionally halogen-, methyl- or methoxy-substituted phenyl, carboxyl, carbalkoxy with 2 to 13 carbon atoms, carbamoyl optionally substituted at the nitrogen by alkyl with 1 to 12 carbon atoms or phenyl, an optionally quaternised heterocyclic structure with 5 or 6 ring members, wherein 1 to 3 ring members represent nitrogen atoms, the sulpho group or its salts or optionally quaternised dialkylamine with 1 to 12 carbon atoms per alkyl part, (e) optionally halogen-, methyl- or methoxy-substituted phenyl or (f) an optionally quaternised heterocyclic structure with 5 or 6 ring members, wherein 1 to 3 ring members represent nitrogen atoms, and X and X' independently of one another denote alkoxy with 1 to 4 carbon atoms, or halogen, located in the 3- and 3'-position respectively, Y and Y' independently of one another denote alkoxy with 1 to 4 carbon atoms, acyloxy with 1 to 4 carbon atoms, benzoyloxy or halogen, located in the 6- and 6'-position, respectively, $t$, $u$, $v$ and $w$ independently of one another denote the number 1 or 0 and Z and Z' independently of one another denote hydrogen or the sulpho group or its salts.

Within the scope of the formula (1), compounds which are above all of interest are those of the formula 2

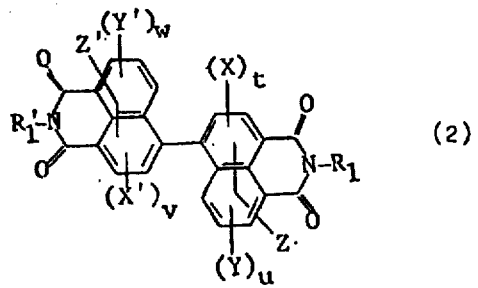

wherein $R_1$ and $R'_1$ independently of one another represent (a) hydrogen, (b) alkyl with 2 to 18 carbon atoms, (c) optionally methyl-substituted cyclohexyl, (d) phenylalkyl with 1 to 4 carbon atoms in the alkyl part, optionally substituted by halogen, methyl or methoxy in the phenyl part, (e) alkyl with 2 to 4 carbon atoms or the sulpho group, (f) alkyl with 1 to 12 carbon atoms, substituted by a radical $-COZ_1$ or $-CON(Z_2Z_3)$, wherein $Z_1$ represents hydroxyl or alkoxy with 1 to 12 carbon atoms, $Z_2$ represents hydrogen, alkyl with 1 to 4 carbon atoms or phenyl and $Z_3$ represents hydrogen or alkyl with 1 to 4 carbon atoms, (g) alkyl with 2 to 6 carbon atoms substituted by an optionally quaternised dialkylamine radical with 1 to 4 carbon atoms per alkyl part, (h) alkyl with 2 to 4 carbon atoms, substituted by optionally methyl-substituted morpholino, piperazino, piperidino, imidazolidon-1-yl or pyridyl-2 or pyridyl-4 optionally substituted by hydroxyl or methoxy in the 3-position, it being possible for these nitrogen-containing radicals to be quaternised, (i) optionally halogen-, methyl- or methoxy-substituted phenyl or (k) optionally quaternised pyridyl-2 or pyridyl-4 or 1,2,4-triazol-3-yl and X,X', Y,Y', Z, Z', $t$, $u$, $v$ and $w$ have the abovementioned meaning.

Amongst the compounds encompassed by the formulae (1) and (2), the symmetrical compounds deserve particular attention (R=R' or $R_1=R'_1$, X=X', Y=Y', Z=Z', $t=v$ and $u=w$), since they are in general more easily accessible.

Alkyl is to be understood as both straight-chain and branched alkyl. Halogen in general represents bromine or preferably chlorine. Acyloxy preferably represents acetyloxy.

Amongst the salts of the sulphonic acid group, the alkali metal salts, alkaline earth metal salts, ammonium salts or amine salts should be singled out. The alkali metal salts, especially the sodium salt, are preferred.

Quaternised groups in general correspond to the partial formulae

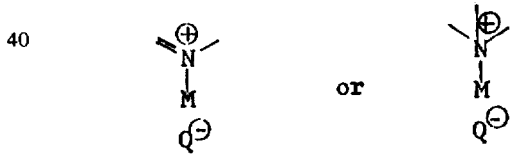

wherein M denotes alkyl with 1 to 4 carbon atoms optionally substituted by hydroxyl or alkoxy with 1 to 4 carbon atoms, benzyl optionally substituted by chlorine or methoxy, or a radical $-CH_2CN$, $-CH_2CONH_2$ or $-CH_2COOR''$, wherein R'' represents an alkyl group with 1 to 4 carbon atoms, and Q denotes halogen such as iodine, bromine and preferably chlorine, an alkyl-sulphuric acid radical with 1 to 4 carbon atoms or a benzene-sulphonic acid radical which is optionally substituted by methyl.

As has been mentioned, the symmetrical compounds are preferred. Amongst these, compounds of particular practical interest are those of the formula 3

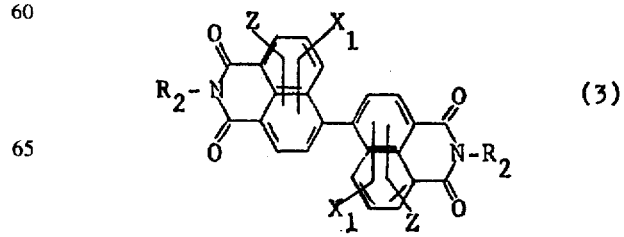

wherein $R_2$ denotes (a) hydrogen, (b) alkyl with 2 to 12 carbon atoms, (c) optionally methyl-substituted cyclohexyl, (d) phenylalkyl with 1 to 4 carbon atoms in the alkyl part, (e) alkyl with 2 or 3 carbon atoms substituted by hydroxyl, alkoxy with 1 to 4 carbon atoms, carboxyl, carbalkoxy with 2 to 5 carbon atoms, the sulpho group or an optionally quaternised dialkylamine radical with 1 to 4 carbon atoms per alkyl radical, (f) optionally quaternised morpholino-, piperazino-, imidazolidon-1-yl-, pyridyl-2- or 3-hydroxy-pyridyl-2-ethyl, (g) methoxyphenyl or phenyl or (h) optionally quaternised pyridyl-2, pyridyl-4 or 1,2,4-triazol-3-yl, $X_1$ denotes hydrogen or alkoxy with 1 to 4 carbon atoms, or chlorine, located in the 3- or 6-position or 3'- or 6'-position and Z denotes hydrogen or the sulpho group or its salts, and above all the compounds of the formula 4

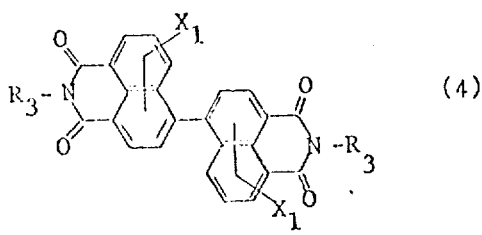

(4)

wherein $R_3$ denotes (a) alkyl with 2 to 12 carbon atoms, (b) alkyl with 2 or 3 carbon atoms substituted by alkoxy with 1 to 4 carbon atoms, (c) alkyl with 1 to 11 carbon atoms substituted by carbalkoxy with 2 to 5 carbon atoms, (d) alkyl with 2 to 6 carbon atoms substituted by dialkylamino with 1 to 4 carbon atoms per alkyl part, or (e) pyridyl-2 or 3-hydroxy-pyridyl-2 and $X_1$ denotes hydrogen or alkoxy with 1 to 4 carbon atoms, or chlorine, located in the 3- or 6- or 3'- or 6'-position.

Where R, R', $R_1$, $R'_1$, $R_2$ or $R_3$ denotes alkyl with 2 to 18 or 2 to 12 carbon atoms, branched alkyl with 3 to 18 or 3 to 12 carbon atoms, respectively, is preferred.

The compounds of the formulae (1) to (4) are manufactured analogously to processes which are in themselves known.

To manufacture a compound of the formula (1) or of subordinate formulae, one mol of a compound of the formula 5

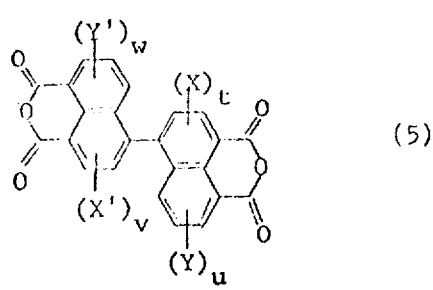

(5)

wherein the various symbols have the indicated meaning, is reacted with one mol each of a compound of the formulae 6a and 6b (6a) R—NH$_2$    and    R'—NH$_2$ (6b)

wherein R and R', except for the quaternising groups, have the indicated meaning.

Symmetrical compounds, for example those of the formula (3), are obtained by reaction of a compound of the formula 7

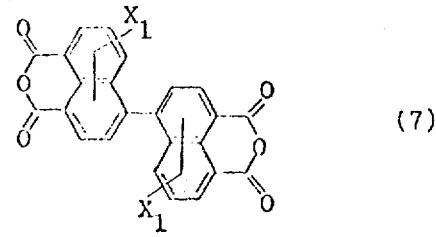

(7)

wherein $X_1$ has the indicated meaning, with a compound of the formula 8

$R_1$—NH$_2$    (8)

wherein $R_1$, with the exception of the quaternising groups, has the indicated meaning, in the molar ratio of 1:2.

For this condensation, the reactants can simply be brought together. However, the process is advantageously carried out in solvents which are inert towards the reactants. As examples thereof there may be mentioned organic solvents such as aromatic hydrocarbons or chlorinated hydrocarbons, for example toluene, xylene, chlorobenzene, dichlorobenzene, alcohols, for example isopropanol, butanol and glycols, such as ethylene glycol, glycol ethers and dimethylformamide. Some reactions can also be carried out in an aqueous phase. The reaction temperature depends on the nature of the components to be reacted and is between 40° and 200°C for the cases to be considered in practice. The reactants can be used in stoichiometric amounts but in some cases an excess or deficiency of one or other reactant is of advantage.

In general, an excess of amine compound is used, 2 to 8, preferably 2 to 3, mols of amine compound being added per mol of dinaphthyltetracarboxylic acid anhydride.

If the compounds according to the invention contain sulpho groups, such groups can be introduced in the usual manner by subsequent sulphonation, for example with oleum. Equally, compounds according to the invention which contain quaternisable nitrogen atoms can be quaternised in accordance with processes which are also customary.

This quaternisation can be carried out in a solvent which is inert towards the reactants, at temperatures of 0° to 200°C, preferably at 20° to 150°C. Examples of such solvents are aromatic hydrocarbons such as benzene, toluene and xylene; halogenated hydrocarbons such as methylene chloride, tetrachloroethylene, chlorobenzene, bromobenzene or dichlorobenzene, and also nitrobenzene, lower alkanols and open or cyclic ethers, such as ethanol, isopropanol, butanol, diethyl ether, dibutyl ether, ethylene glycol monomethyl ether, ethylene glycol monoethyl ether, tetrahydrofurane or dioxane; lower ketones such as acetone or methyl ethyl ketone; fatty acid amides such as dimethylformamide or dimethylacetamide; sulphoxides such as dimethylsulphoxide and ureas such as tetramethylurea. If desired, the quaternary salts produced can be converted into other salts by double reaction.

The reaction described above can in principle be carried out with any quaternising agent. For example, such quaternising agents are alkyl halides, such as methyl iodide and butyl bromide, dialkyl sulphates such as dimethyl sulphate and diethyl sulphate, aralkyl halides such as benzyl chloride or bromide, halogenoacetic acid esters and their derivatives, and esters of benzenesulphonic acid or of p-toluenesulphonic acid, especially their methyl or ethyl esters.

The 4,4'-dinaphthyl-1,1',8,8'-tetracarboxylic acid anhydrides of the formula (5) or (7) which serve as starting compounds can be obtained by condensation of the corresponding 4-bromo-naphthalic acid with copper powder in an inert organic solvent, according to Ullmann.

The new compounds defined above show a more or less pronounced fluorescence in the dissolved or finely divided state. They can be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:

a. Polymerisation products based on organic compounds containing at least one polymerisable carbon-carbon double bond, that is to say their homopolymers or copolymers as well as their after-treatment products such as, for example, cross-linking, grafting or degradation products, polymer blends, or products obtained by modification of reactive groups, for example polymers based on α,β-unsaturated carboxylic acids or derivatives of such carboxylic acids, especially on acrylic compounds (such as, for example, acrylic esters, acrylic acid, acrylonitrile, acrylamides and their derivatives or their methacryl analogues), of olefine hydrocarbons (such as, for example, ethylene, propylene, styrenes or dienes and also so-called ABS polymers), and polymers based on vinyl and vinylidene compounds (such as, for example, vinyl chloride, vinyl alcohol and vinylidene chloride), b. Polymerisation products such as are obtainable by ring opening, for example, polyamides of the polycaprolactam type, and also polymers which are obtainable both via polyaddition and via polycondensation, such as polyethers or polyacetals, c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic acid-dialcohol polycondensates as well as their crosslinking products with copolymerisable vinyl monomers), unbranched and branched (also including those based on polyhydric alcohols, such as, for example alkyd resins) polyesters, polyamides (for example hexamethylenediamine adipate), maleate resins, melamine resins, their precondensates and analogues, polycarbonates and silicones, d. Polyaddition products such as polyurethanes (cross-linked and non-crosslinked) and epoxide resins.

II. Semi-synthetic organic materials such as, for example, cellulose esters of varying degrees of esterification (so-called 2½ acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates, knitted fabrics and papers, cardboards or paper compositions.

The new compounds of the Formulae (1) to (4) are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened with the compounds according to the invention, this is advantageously effected in an aqueous medium, wherein the compounds in question are present in a finely divided form (suspensions, so-called microdispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing of textile substrates, as is practised in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, sheets (for example, hot milling into polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the spun tow before stretching.

The new optical brighteners according to the present invention can, for example, also be employed in the following use forms:

a. Mixed with dyestuffs (shading) or pigments (coloured pigments or especially, for example, white pigments), or as an additive to dye baths, printing pastes, discharge pastes or reserve pastes, or for the aftertreatment of dyeings, prints or discharge prints.

b. Mixed with so-called "carriers", wetting agents, plasticisers, swelling agents, anti-oxidants, light protection agents, heat stabilisers and chemical bleaching agents (chlorite bleach or bleaching bath additives).

c. Mixed with crosslinking agents or finishing agents (for example starch or synthetic finishes), and in combination with the most diverse textile finishing processes, especially synthetic resin finishes (for example creaseproof finishes such as "wash-and-wear", "permanent-press" or "no-iron"), as well as flameproof finishes, soft handle finishes, anti-soiling finishes or antistatic finishes, or antimicrobial finishes.

d. Incorporation of the optical brighteners into polymeric carriers (polymerisation, polycondensation or polyaddition products), in a dissolved or dispersed form, for use, for example, in coating agents, impregnating agents or binders (solutions, dispersions and emulsions) for textiles, fleeces, paper and leather.

e. As additives to so-called "master batches".

f. As additives to the most diverse industrial products in order to render these more marketable (for example improving the appearance of soaps, detergents, pigments), g. In combination with other optically brightening substances, h. In spinning bath preparations, that is to say as additives to spinning baths such as are used for improving the slip for the further processing of synthetic fibres, or from a special bath before the stretching of the fibre.

i. As scintillators for various purposes of a photographic nature, such as, for example, for electrophotographic reproduction or supersensitisation, and for the optical brightening of photographic layers, optionally in combination with white pigments such as, for example, $TiO_2$.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example of polyester fibres, with the brighteners according to the invention is to impregnate these fibres with the aqueous dispersions (or optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used, relative to the material to be optically brightened, can vary within wide limits. A distinct and durable effect is already achievable with very small amounts, in certain cases, for example, amounts of 0.0005 percent by weight. However, amounts of up to about 0.8 percent by weight and optionally of up to about 2 percent by weight can be employed. For most practical purposes, amounts between 0.005 and 0.5 percent by weight are of preferred interest.

The new optical brightening agents, where they contain groups which confer solubility in water, are also particularly suitable for use as additives for wash liquors or industrial and domestic washing agents, to which they can be added in various ways. They are appropriately added to wash liquors in the form of their solutions in water or organic solvents or in a finely divided form, as aqueous dispersions. They are advantageously added to domestic or industrial washing agents in any stage of the manufacturing process of the washing agents, for example to the so-called "slurry" before spray-drying the washing powder, or during the preparation of liquid washing agent combinations. They can be added either in the form of a solution or dispersion in water or other solvents or, without auxiliaries, as a dry brightening powder. For example, the brightening agents can be mixed, kneaded or ground with the detergent substances and, in this form, admixed to the finished washing powder. However, they can also be sprayed in a dissolved or pre-dispersed form onto the finished washing agent.

Possible washing agents are the known mixtures of detergent substances such as, for example, soap in the form of chips and powders, synthetics, soluble salts of sulphonic acid half esters of higher fatty alcohols, arylsulphonic acids with higher and/or multiple alkyl substituents, sulphocarboxylic acid esters of medium to higher alcohols, fatty acid acylaminoalkyl- or acylaminoaryl-glycerinesulphonates and phosphoric acid esters of fatty alcohols. Possible so-called "builders" which can be used are, for example, alkali metal polyphosphates and polymetaphosphates, alkali metal pyrophosphates, alkali metal salts of carboxymethylcellulose and other "soil redeposition inhibitors", and also alkali metal silicates, alkali metal carbonates, alkali metal borates, alkali metal perborates, nitrilotriacetic acid, ethylenediaminotetracetic acids, and foam stabilisers such as alkanolamides of higher fatty acids. The washing agents can further contain for example: antistatic agents, skin protection agents which restore fat, such as lanolin, enzymes, anti-microbial agents, perfumes and dyestuffs.

The new optical brighteners have the particular advantage that they are also active in the presence of active chlorine donors such as, for example, hypochlorite, and can be used without significant loss of the effects in wash liquors containing non-ionic washing agents, for example alkylphenol polyglycol ethers.

The compounds according to the invention are added in amounts of 0.005 – 1% or more, relative to the weight of the liquid or pulverulent finished washing agent. Washing liquors which contain the indicated amounts of the optical brighteners claimed impart a brilliant appearance in daylight when used to wash textiles of cellulose fibres, polyamide fibres, cellulose fibres with a high quality finish, polyester fibres, wool and the like.

The washing treatment is carried out as follows, for example:

The textiles indicated are treated for 1 to 30 minutes at 20° to 100°C in a wash liquor which contains 1 to 10 g/kg of a built-up composite washing agent and 0.05 to 1%, relative to the weight of the washing agent, of the claimed brightening agents. The liquor ratio can be 1:3 to 1:50. After washing, the textiles are rinsed and dried in the usual manner. The wash liquor can contain 0.2 g/l of active chlorine (for example as hypochlorite) or 0.1 to 2 g/l of sodium perborate as a bleaching additive.

In the examples parts, unless otherwise stated, are always parts by weight and percentages are always percentages by weight. Unless otherwise stated, melting points and boiling points are uncorrected.

EXAMPLE 1

19.71 g of finely ground 4,4'-dinaphthyl-1,1',8,8'-tetracarboxylic acid dianhydride are suspended in 300 ml of water and 36.5 g of isobutylamine are added. The suspension is now stirred for 18 hours at room temperature, whereupon a solution results after approx. 2 hours. Thereafter, the mixture is heated to 95° – 100°C for 5 hours. After cooling, the product which has precipitated is filtered off, washed with water and dried in vacuo at 100°C. The yield is 23.8 g.

After repeated recrystallisation from benzene with the aid of fuller's earth, 21.2 g of the compound of the formula 9

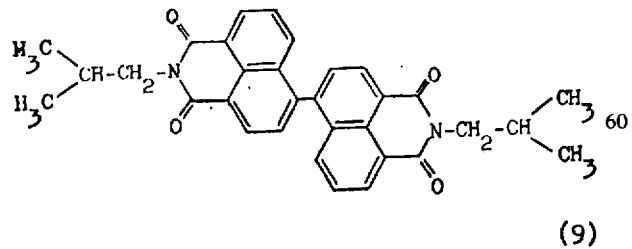

(9)

are obtained as a white powder of melting point 217° to 218°C. The product can be dissolved in chlorobenzene to give a blueviolet fluorescence. The new compound is very suitable for brightening various organic polymeric substances, especially synthetic textile fibres and polymeric plastics.

The compounds of the formula (10) listed in Table I are manufactured analogously. They show similar properties to the abovementioned product.

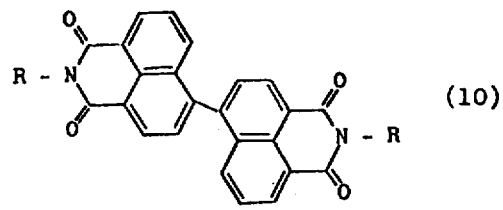

(10)

Table I

| Formula | R | Melting point, uncorrected, in °C |
|---|---|---|
| (11) | —H | above 300° |
| (12) | —C$_2$H$_5$ | above 300° |
| (13) | —n—C$_3$H$_7$ | 298–299° |
| (14) | —n—C$_4$H$_9$ | 194–196° |
| (15) | —iso—C$_3$H$_7$ | 282–284° |
| (16) | —CH$_2$CH$_2$OH | 248–250° |
| (17) | —(CH$_2$)$_3$—OCH$_3$ | 215–217° |

EXAMPLE 2

19.71 g of finely ground 4,4'-dinaphthyl-1,1',8,8'-tetracarboxylic acid dianhydride are suspended in 250 ml of ethylene glycol and 14.12 g of 2-aminopyridine are added. The suspension is heated to 140°C over the course of 3 hours and is stirred at this temperature for 4 hours. After cooling, the product which has precipitated is filtered off, washed with ethanol and dried in vacuo at 100°C. The yield is 26 g.

After repeated recrystallisation from chlorobenzene, with the aid of fuller's earth, 23.7 g, corresponding to 88% of theory, of the compound of the formula (18) are obtained as a white powder of melting point above 260°C.

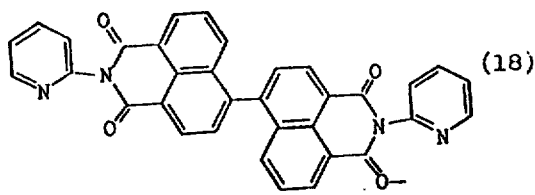

(18)

The product dissolves in chlorobenzene to give a blue-violet fluorescence. The new compound is an excellent agent for brightening plastics and synthetic fibres.

The compounds of the formula (19) listed in Table II are manufactured analogously. They show similar properties to the abovementioned product.

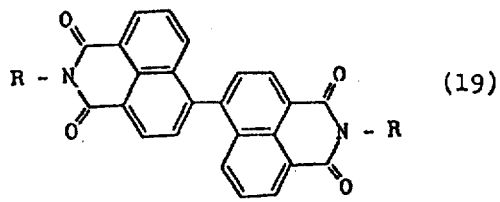

(19)

Table II

| Formula | R | Melting point, uncorrected in °C |
|---|---|---|
| (20) | $-(CH_2)_3COOH$ | 175–177° |
| (21) | $-(CH_2)_5COOH$ | 114–116° |
| (22) | $-(CH_2)_{10}COOH$ | 111–112° |
| (23) | $-CH_2-COOH$ | above 260° |
| (24) |  | above 260° |
| (25) | $-CH_2CH_2-SO_3H$ | above 260° |
| (26) | 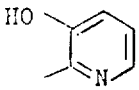 | above 260° |
| (27) | $-CH_2CH_2-COOH$ | above 260° |
| (28) | $-(CH_2)_2-N\overbrace{\phantom{HH}}N-H$ | 229–231° |

EXAMPLE 3

19.71 g of finely ground 4,4'-dinaphthyl-1,1',8,8'-tetracarboxylic acid dianhydride are heated with 250 ml of 1,2-dichlorobenzene and 19.4 g of n-octylamine to 160°C over the course of 3 hours and stirred at this temperature for a further two hours. The resulting solution is filtered whilst still hot and the 1,2-dichlorobenzene is steam-distilled. The residual product is filtered off and dried in vacuo at 100°C. The yield is 30.1 g, corresponding to 97.5% of theory.

After repeated recrystallization from toluene, with the aid of fuller's earth, 23.9 g, corresponding to 77.5% of theory, of the compound of the formula 29

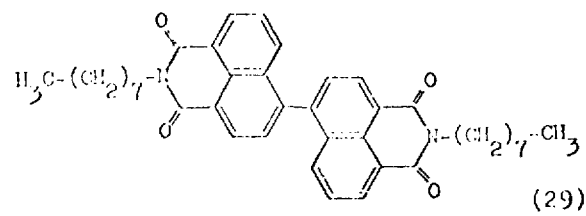

(29)

are obtained as a light beige powder of melting point 157 to 159°C.

The compounds of the formula (30) listed in Table III are manufactured analogously.

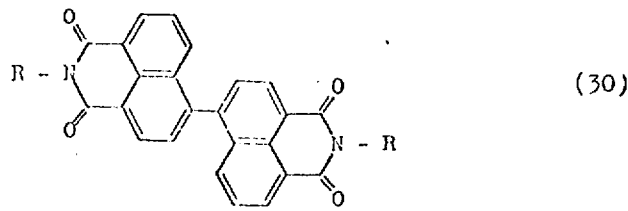

(30)

Table III

| Formula | R | Melting point, uncorrected, in °C |
|---|---|---|
| (31) | $-(CH_2)_{11}-CH_3$ | 139 – 141 |

TABLE III (continuation)

| Formula | R | Melting point, uncorrected, in °C |
|---|---|---|
| (32) | -CH-(CH$_2$)$_4$-CH$_3$ <br> \| <br> CH$_2$CH$_3$ | 174 – 175 |
| (33) | -(CH$_2$)$_3$-N(CH$_3$)$_2$ | 198 – 200 |
| (34) | -(CH$_2$)$_2$-N(CH$_3$)$_2$ | 221 – 222 |
| (35) | 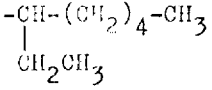 | 261 – 264 |
| (36) | 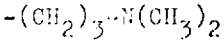 | above 260 |
| (37) | 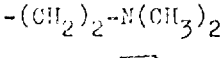 | above 260 |
| (38) | 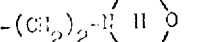 | above 260 |
| (39) | 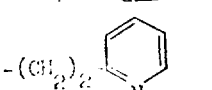 | above 260 |
| (40) | 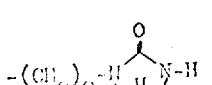 | 274 – 275 |
| (41) | 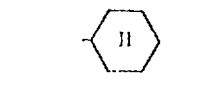 | 265 – 267 |
| (42) | 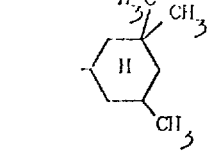 | 240 – 243 |

EXAMPLE 4

19.7 g of 4,4'-dinaphthyl-1,1',8,8'-tetracarboxylic acid anhydride are heated to 100°C with 130 ml of dimethylformamide. A solution of 10.2 g of aniline in 20 ml of dimethylformamide is now allowed to run in whilst stirring. The mixture is stirred for a further 2 hours at 100°C and is thereafter heated to the boil for 5 hours. From the solution which results after a short time, colourless crystals precipitate over the course of hours. The mixture is allowed to cool to 80°C and the product which has precipitated is filtered off. It is washed with dimethylformamide and alcohol and dried in vacuo at 120°C. The yield is 22.8 g. After recrystallisation from nitrobenzene, 20.5 g of the compound of the formula (43) are obtained.

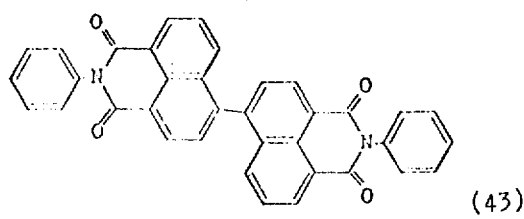

(43)

The melting point is above 330°C. The compound of the formula (44), melting point above 300°C, is manufactured analogously.

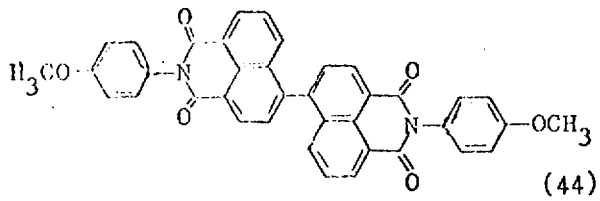

(44)

EXAMPLE 5

18.2 g of finely ground 4,4'-dinaphthyl-3,3'-dimethoxy-1,1',8,8'-tetracarboxylic acid dianhydride are suspended in 500 g of water and 35.5 g of a 50.7% strength aqueous ethylamine solution are added. The suspension is stirred for 18 hours at room temperature. Thereafter it is heated to 50° – 60°C for 1 hour and then, to complete the reaction, for a further 6 hours to 90° – 95°C. After cooling, the product which has precipitated is filtered off, washed with water and dried in vacuo at 120°C. The yield is 19.4 g.

After repeated recrystallisation from chlorobenzene (with the aid of fuller's earth) the compound of the formula 45

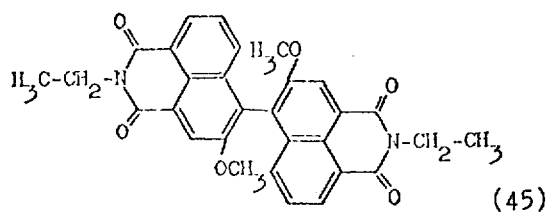

(45)

is obtained as pale yellow crystals of melting point 292 to 293°C.

EXAMPLE 6

18.2 g of 4,4'-dinaphthyl-6,6'-dimethoxy-1,1',8,8'-tetracarboxylic acid dianhydride are heated with 320 g of 1,2-dichlorobenzene and 14.2 g of n-propylamine for one hour to 60° – 70°C. Thereafter the mixture is heated to 110°C and stirred at this temperature for a further hour. To complete the reaction, the mixture is further heated to 170° – 180°C for one hour. The resulting solution is filtered whilst still hot and the 1,2-dichlorobenzene is distilled off in vacuo.

After repeated recrystallisation from chlorobenzene, with the aid of fuller's earth, the compound of the formula 46

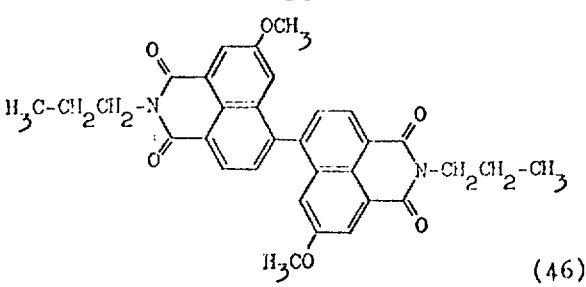

(46)

is obtained as pale yellow crystals of melting point 234° to 235°C.

EXAMPLE 7

11.2 g of the compound of the formula (12) are introduced into 50 ml of 25% strength oleum. The mixture is now heated to 90°C over the course of one hour and is stirred at this temperature for 4 hours. After cooling, the clear, dark brown solution is poured out onto 700 g of ice and the disulphonic acid is salted out by adding sodium chloride. The yellow precipitate is filtered off, washed with sodium chloride solution and dried in vacuo at 100°C. After recrystallisation, 14.8 g, corresponding to 88% of theory, of the compound of the formula 47

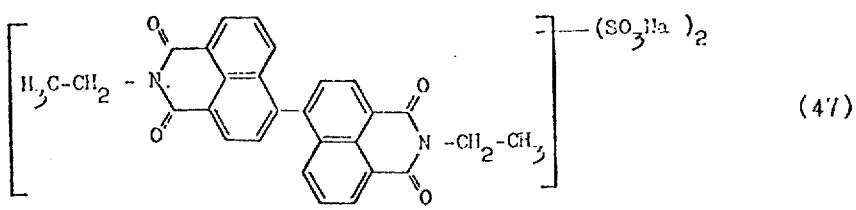

(47)

are obtained as a yellow powder of absorption $\lambda_{max}$ 358 nm.

The compounds listed in Table IV below are manufactured in a similar manner using appropriately substituted 4,4'-dinaphthyl-1,1',8,8'-tetracarboxylic acid diamides.

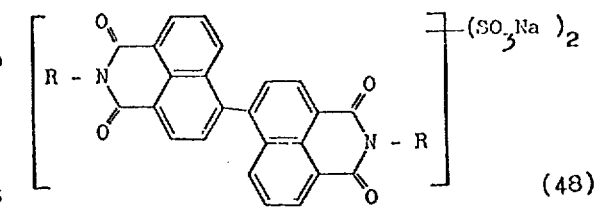

(48)

Table IV

| Formula | R | $\lambda_{max}$.nm |
|---|---|---|
| (49) | —n—C$_4$H$_9$ | 360 |
| (50) | —CH$_2$CH$_2$—OH | 359 |
| (51) | —(CH$_2$)$_3$—OCH$_3$ | 361 |
| (52) | —CH$_2$CH$_2$—COOH | 358 |

EXAMPLE 8

11.6 g of finely ground sodium salt of 4,4'-dinaphthyl-1,1',8,8'-tetracarboxylic acid diamide N,N'-dipropionic acid together with 4.62 g of anhydrous sodium carbonate and 5.56 g of dimethyl sulphate are stirred in 100 ml of chlorobenzene at 100°C for 24 hours. The reaction mixture is cooled and filtered and the filter residue is well washed with water. The product which remains is twice recrystallised from chlorobenzene with the aid of fuller's earth. 9 g, corresponding to to 80% of theory, of the compound of the formula 53

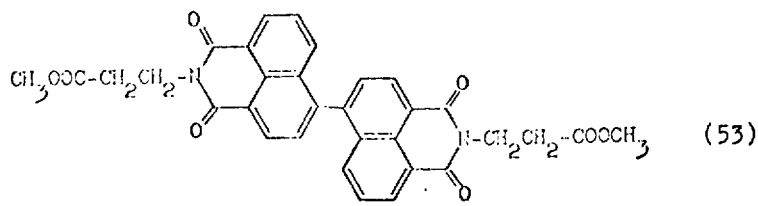

(53)

are obtained as a white powder of melting point 254° to 256°C.

The compounds of the formula (54) listed in Table V are manufactured analogously They display similar properties to the abovementioned product.

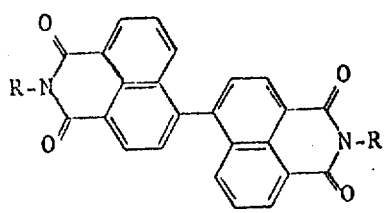

(54)

Table V

| Formula | R | Melting point |
|---------|---|---------------|
| (55) | —(CH$_2$)$_3$COOCH$_3$ | 205–206°C |
| (56) | —(CH$_2$)$_5$COOCH$_3$ | 167–169°C |
| (57) | —CH$_2$—COOCH$_3$ | above 260°C |
| (58) | —(CH$_2$)$_{10}$COOCH$_3$ | 108–109°C |

EXAMPLE 9

16 g of 4,4'-dinaphthyl-1,1',8,8'-tetracarboxylic acid N,N'-(2-dimethylaminoethyl)-diimide (formula (34) in 150 ml of chlorobenzene are treated with 8.2 g of dimethyl sulphate at 100°C whilst stirring, and the mixture is stirred for 2 hours at 100°C and then cooled. The white precipitate formed was filtered off, washed with hot chlorobenzene and dried in vacuo at 100°C. 23 g, corresponding to 97.5% of theory, of the compound of the formula (59)

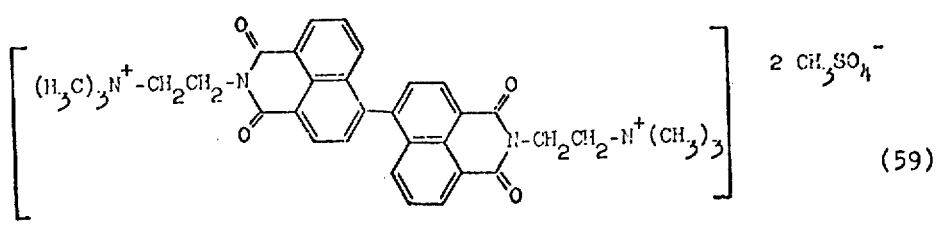

(59)

having a melting point above 300°C, are thus obtained.

The new compound dissolves in water to give a blue fluorescence and is very suitable for the brightening of polyacrylic fibres.

The compounds of the formula (60) listed in the table which follows are manufactured analogously. They show similar properties to the abovementioned product.

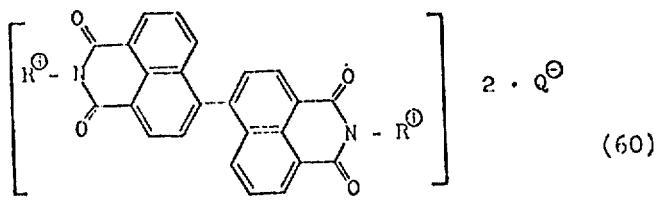

(60)

Table VI

| Formula | R$^{\oplus}$ | Q$^{\ominus}$ |
|---------|--------------|---------------|
| (61) | —CH$_2$CH$_2$CH$_2$—N$^+$(CH$_3$)$_3$ | CH$_3$SO$_4^-$ |

Table VI—Continued

| Formula | R ⊕ | Q ⊖ |
|---|---|---|
| (62) | -CH₂CH₂-N⁺(morpholine, CH₃) | CH₃SO₄⁻ |
| (63) | -CH₂CH₂-(N-methylpyridinium) | CH₃SO₄⁻ |
| (64) | (1,3-dimethylimidazolium) | Cl⁻ · ZnCl₂ |
| (65) | (N-methylpyridinium) | CH₃SO₄⁻ |

EXAMPLE 10

0.12 ml of 85% strength formic acid and 0.06 g of alkyl polyglycol ether are added to 100 ml of water.

A solution of the optical brightener of the formula (55) is manufactured by dissolving 1 g in 1,000 ml of water. 1.5 ml of this stock solution are added to the solution described above. This aqueous solution containing the brightener is warmed to 60°C. An orlon fabric weighing 3 g is then introduced into the solution. The temperature is raised to 95° – 98°C over the course of 10 – 15 minutes and is maintained thereat for 60 minutes. The fabric is then rinsed for 2 minutes in running cold water and is subsequently dried for 20 minutes at 60°C.

The fabric treated in this way shows a distinct brightening effect.

If instead of the abovementioned brightener the same amounts of a brightener of the formulae (33), (34), (35), (36), (61), (62), (63), (64) or (65) are used, and otherwise the identical procedure is followed, similar effects are obtained.

EXAMPLE 11

0.06 ml of 40% strength acetic acid and 0.06 ml of alkyl polyglycol ether are added to 95 ml of water.

A solution of an optical brightener of the formula (9) is manufactured by dissolving 1 g in 1,000 ml of DMF. 6 ml of this stock solution are added to the solution described above. This aqueous dispersion containing the brightener is warmed to 60°C and a triacetate fabric weighing 3 g is then introduced into the solution. The temperature is raised to 95° – 98°C over the course of 10 – 15 minutes and is maintained thereat for 30 minutes. The fabric is then rinsed for 2 minutes in running cold water and is subsequently dried for 20 minutes at 60°C.

The fabric treated in this way shows a distinct brightening effect.

If instead of the abovementioned brightener equal amounts of a brightener of the formulae (12), (14), (16), (29) or (31) are used and otherwise the same procedure is followed, similar effects are obtained.

EXAMPLE 12

0.06 g of an alkyl polyglycol ether is added to 100 ml of water. A solution of the optical brightener of the formula (9) is manufactured by dissolving 1 g in 1,000 ml of dimethylformamide. 1.5 ml of this stock solution are added to the aqueous solution described above.

This aqueous solution containing the brightener is warmed to 60°C and a nylon staple fabric weighing 3 g is then introduced into the solution. The temperature is raised to 90° – 92°C over the course of 10 – 15 minutes and is maintained thereat for 30 minutes. The fabric shows a white and brilliant appearance.

If instead of the abovementioned brightener the same amounts of a brightener of the formulae (12), (13), (141), (25), (29), (40), (41) or (47) are used and otherwise the same procedure is followed, similar effects are obtained.

EXAMPLE 13

An approximately 10% strength dispersion of the optical brightener of the formula (9) is manufactured by diluting 100 g of the sand-ground material with 1,000 ml of water and adding 2 g of wetting agent. A polyester fabric is padded with this dispersion (20°C) (squeezing-out effect 50 – 60%, roller pressure 30 kg/cm², speed 3 m/minute). The fabric is dried for 20 minutes at 60°C.

The dried fabric is subsequently fixed for 30 seconds at 200°C.

The fabric treated in this way shows a distinct brightening effect.

If instead of the abovementioned brightener the same amounts of a brightener of the formulae (12), (13), (14), (18), (29), (40), (42) or (45) are used and otherwise the same procedure is followed, similar effects are obtained.

EXAMPLE 14

0.06 g of 40% strength acetic acid and 0.06 g of alkyl polyglycol ether are added to 100 ml of water.

A solution of the optical brightener of the formula (9) is manufactured by dissolving 1 g in 1,000 ml of DMF. 1.5 ml of this stock solution are added to the solution described above. This aqueous dispersion containing the brightener is warmed to 60°C and a polypropylene fabric weighing 3 g is then introduced into the solution. The temperature is raised to 95° – 98°C over the course of 10 – 15 minutes and is maintained thereat for 30 minutes. The fabric is then rinsed for 2 minutes in running cold water and is subsequently dried for 20 minutes at 60°C.

The fabric treated in this way shows a distinct brightening effect.

If instead of the abovementioned brightener the same amounts of a brightener of the formulae (12), (40) or (42) are used and otherwise the same procedure is followed, similar effects are obtained.

EXAMPLE 15

300 parts of hexamethylenediamine adipate are dissolved in 300 parts of distilled water at 80°C. 1.8 parts of sebacic acid, 1.2 parts of titanium dioxide (anatase) and 0.3 part of the optical brightener of the formula (9) are introduced into this solution and stirred until homogeneous distribution has taken place. The liquid mixture is introduced, with exclusion of oxygen, into an autoclave heated to 150°C and thereafter the temperature is raised to 280°C over the course of 1 hour. During this time, the pressure in the autoclave is kept below 30 atmospheres by blowing off steam. When the temperature maximum of 280° – 290°C has been reached, the pressure is brought to atmospheric pressure by blowing off the volatile constituents over the course of 10 to 20 minutes. Thereafter the mass is kept for a further 4 hours at 280°C at atmospheric pressure, with exclusion of oxygen. After this time, the condensation has progressed to the point that the polycondensate can be spun by means of nitrogen through a nozzle fixed to the bottom of the autoclave. Pure white polyamide filaments are thus obtained.

Similar effects are obtained if, whilst otherwise following the identical procedure, the same amounts of the brightener of the formulae (12), (13), (14), (18), (29), (38), (40), (45) or (53) are used instead of the abovementioned brightener.

EXAMPLE 16

400 parts of caprolactam, 40 parts of water, 0.4 part of the optical brightener of the formula (18) and 1.6 parts of titanium dioxide (anatase) are mixed with one another and warmed to 70°C until the mass has liquefied. The liquid mixture is introduced into a stainless steel pressure vessel and heated to a temperature of 250°C over the course of 1 hour whilst excluding oxygen; in the course thereof, a pressure of 10 – 15 atmospheres is set up. After this time, the water is distilled off and thereafter the polymeric mass is kept for 3 hours without pressure at 250°C to achieve complete degassing. By doing so, the mass reaches a viscosity which permits the polymer to be extruded in the form of tapes or filaments by means of nitrogen through a nozzle fixed to the bottom of the pressure vessel. The solidified polyamide is freed of monomeric constituents by extraction with water. The polyamide fibre obtained by this process is distinguished by a very high degree of whiteness.

If the procedure indicated in the above example is followed but instead of the brightener mentioned therein the same amounts of a brightener of the formulae (9), (12), (13), (29), (38), (40), (45) or (53) are used and otherwise the same procedure is employed, similar effects are obtained.

EXAMPLE 17

1,000 parts of polyester granules of poly(terephthalic acid/ethylene glycol) are intimately mixed with 0.25 part of the optical brightener of the formula (12) and then spun under nitrogen from an extruder at a temperature of 265° – 285°C through a spinneret, in a known manner, to give filaments. The polyester filaments thus obtained show a brilliant white appearance.

If the procedure indicated in the above example is followed but instead of the brightener mentioned there the same amounts of a brightener of the formulae (9), (13), (17), (40), (41), (45) or (53) are used and otherwise the same procedure is employed, similar effects are obtained.

EXAMPLE 18

388 g of benzene-1,4-dicarboxylic acid dimethyl ester, 300 g of 1,2-ethanediol and 0.4 g of antimony oxide are heated in a stainless steel autoclave, equipped with a stirrer, a gas inlet tube, a vacuum device, a descending condenser and a heating jacket, to 200°C external temperature whilst blowing pure nitrogen through the mixture, and are kept at this temperature for 3 hours. In the course thereof, methanol slowly distils off. 0.4 g of the optical brightener of the formula (12), dissolved in 40 g of 1,2-ethanediol, are now carefully injected into the autoclave with exclusion of air, after having raised the temperature to 285°C external temperature over the course of one hour, in the course of which 1,2-ethanediol distils off. Thereafter, vacuum is applied to the autoclave, the pressure is slowly reduced to 0.2 mm Hg and the condensation is completed over the course of 3 hours under these conditions. During these operations, the mixture is well stirred. The liquid condensation polymer is extruded through the bottom nozzle by means of nitrogen. Monofilaments showing a brilliant white appearance can be manufactured from the polymer thus obtained.

If instead of the abovementioned brightener identical amounts of a brightener of the formulae (9), (13), (17), (27), (40), (41), (45) or (53) are used, and otherwise the same procedure is followed, similar effects are obtained.

EXAMPLE 19

67 parts of polyvinyl chloride powder, 33 parts of dioctyl phthalate, 2 parts of di-n-butyl-dilauryl-dioxystannate, 0.3 part of sodium pentaoctyltripolyphosphate and 0.05 part of the optical brightener of the formula (45) are gelled for 15 minutes on a mixing mill at 160°C and subsequently drawn out into sheets. The polyvinyl chloride sheet thus produced shows a strong fluorescence and a brilliant white appearance in daylight.

If instead of the abovementioned brightener identical amounts of a brightener of the formulae (9), (12), (13), (17), (33), (35), (45) or (46) are used and otherwise the same procedure is followed, similar effects are obtained.

EXAMPLE 20

100 parts of polypropylene, 0.5 part of titanium dioxide and 0.05 part of the optical brightener of the formula (9) are homogenised in a kneader at 200°C. The melt is spun through spinnerets under an inert gas at 2-3 atmospheres gauge and a temperature of 280°-300°C, in accordance with known methods. The polypropylene filaments thus obtained are distinguished by a high degree of whiteness. If instead of the abovementioned brightener identical amounts of a brightener of the formulae (12), (15), (31), (40) or (42) are used and otherwise the same procedure is followed, similar effects are obtained.

We claim:

1. A symmetrical 4,4'-dinaphthyl-1,1', 8,8'-tetracarboxylic acid diimide, corresponding to the formula 2

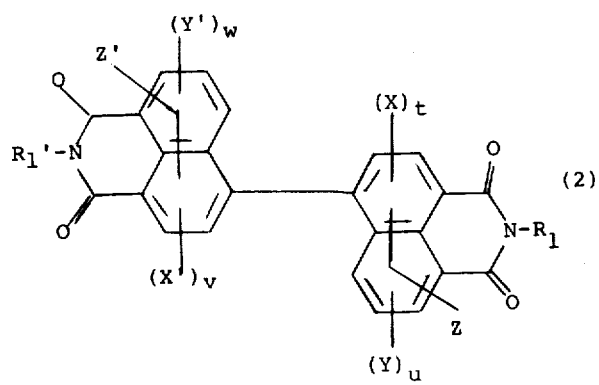

wherein $R_1$ and $R'_1$ each represent (a) alkyl with 2 to 18 carbon atoms, (b) cyclohexyl or 3,3,5 trimethyl-substituted cyclohexyl, (c) phenylalkyl with 1 to 4 carbon atoms in the alkyl part, unsubstituted or mono-substituted by halogen, methyl or methoxy in the phenyl part, (d) alkyl with 2 to 4 carbon atoms, mono-substituted by hydroxyl, alkoxy with 1 to 12 carbon atoms or the sulpho group, (e) alkyl with 1 to 12 carbon atoms, mono-substituted by a group -$COZ_1$, wherein $Z_1$ represents hydroxyl or alkoxy with 1 to 12 carbon atoms, or (f) phenyl or halogen-, methyl- or methoxy-mono-substituted phenyl, X and X' each denote alkoxy with 1 to 4 carbon atoms, or halogen, located in the 3- or 3'-position, $Y_1$ and $Y_1'$ each denote alkoxy with 1 to 4 carbon atoms, acetyloxy, benzoyloxy or halogen, located in the 6- or 6'- position, $t$, $u$, $v$ and $w$ each denote the number 1 or 0 and Z and Z' each denote hydrogen or the sulpho group or its alkali-group or alkaline-earth-metal salts.

2. A symmetrical 4,4'-dinaphthyl-1,1', 8,8'-tetracarboxylic acid diimide according to claim 2 corresponding to the formula 3

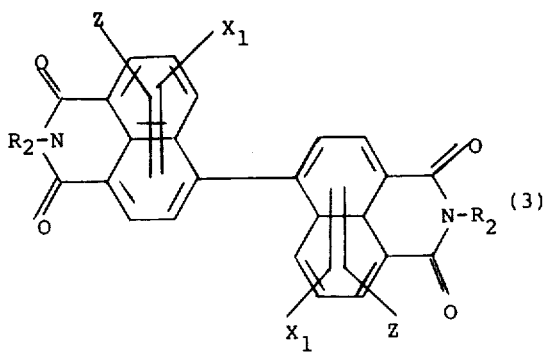

wherein $R_2$ denotes (a) alkyl with 2 to 12 carbon atoms, (b) cyclohexyl or methyl-cyclohexyl, (c) phenyl-alkyl with 1 to 4 carbon atoms in the alkyl part, or (d) alkyl with 2 or 3 carbon atoms mono-substituted by hydroxyl, alkoxy with 1 to 4 carbon atoms, carboxyl, carbalkoxy with 2 to 5 carbon atoms or the sulpho group, $X_1$ denotes hydrogen or alkoxy with 1 to 4 carbon atoms, or chlorine, located in the 3- or 6-position or 3'- or 6'-position and Z denotes hydrogen or the sulpho groups or its alkali-group or alkaline-earth-metal salts.

3. A symmetrical 4,4'-dinaphthyl-1,1'-8,8'-tetracarboxylic acid diimide according to claim 2, corresponding to the formula 4

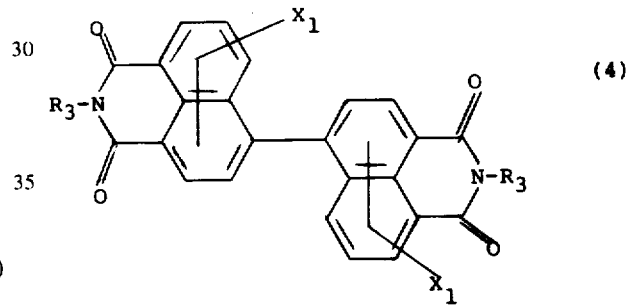

wherein $R_3$ denotes (a) alkyl with 2 to 12 carbon atoms, (b) alkyl with 2 or 3 carbon atoms mono-substituted by hydroxyl or alkoxy with 1 to 4 carbon atoms or (c) alkyl with 1 to 11 carbon atoms mono-substituted by carboxyl or carbalkoxy with 2 to 5 atoms, and $X_1$ denotes hydrogen or alkoxy with 1 to 4 carbon atoms, or chlorine, located in the 3- or 6- or 3'- or 6'-position.

4. A 4,4'-dinaphthyl-1,1',8,8'-tetracarboxylic acid diimide as defined in claim 1, of the formula

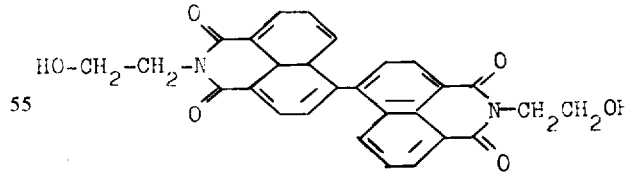

5. A 4,4'-dinaphthyl-1,1',8,8'-tetracarboxylic acid diimide as defined in claim 1, of the formula

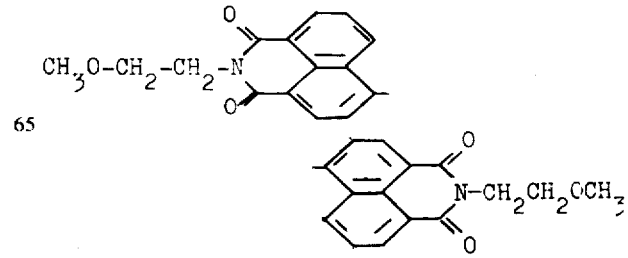

6. A 4,4′-dinaphthyl-1,1′,8,8′-tetracarboxylic acid diimide as defined in claim 1, of the formula
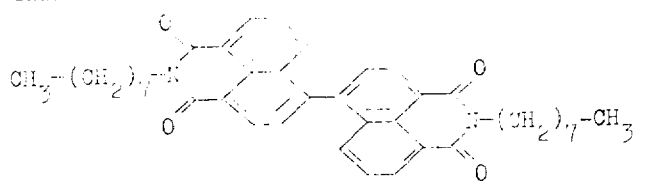
7. A 4,4′-dinaphthyl-1,1′,8,8′-tetracarboxylic acid diimide as defined in claim 1, of the formula
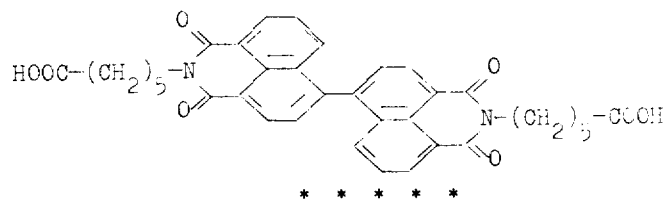
* * * * *